United States Patent
Chapman et al.

(10) Patent No.: US 10,248,364 B2
(45) Date of Patent: Apr. 2, 2019

(54) METHOD AND SYSTEM FOR PRINT DEVICE PROBLEM CAPTURE

(71) Applicant: Xerox Corporation, Norwalk, CT (US)

(72) Inventors: Edward N. Chapman, Rochester, NY (US); Paul Roberts Conlon, South Bristol, NY (US); Timothy L. Dioguardi, Webster, NY (US); Lee Coy Moore, Penfield, NY (US); Stephen Santini, Honeoye Falls, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/631,103

(22) Filed: Jun. 23, 2017

(65) Prior Publication Data
US 2018/0373465 A1    Dec. 27, 2018

(51) Int. Cl.
*G06F 3/12* (2006.01)
*H04N 1/00* (2006.01)

(52) U.S. Cl.
CPC ............ *G06F 3/121* (2013.01); *G06F 3/1205* (2013.01); *G06F 3/1259* (2013.01)

(58) Field of Classification Search
CPC ...... G06F 3/121; G06F 3/1204; G06F 3/1205; G06F 3/1234; G06F 3/1259; G06F 3/1275; G06F 3/1285; H04N 1/00222; H04N 1/00233; H04N 1/00347; H04N 2201/0094; H04N 2201/0087
USPC .............. 358/1.1–1.18, 402, 448; 399/18–20
See application file for complete search history.

(56) References Cited

U.S. PATENT DOCUMENTS

| | | | |
|---|---|---|---|
| 7,430,055 B2 | 9/2008 | Faynor | |
| 8,139,961 B2 | 3/2012 | Mandel et al. | |
| 8,736,929 B2 | 5/2014 | Poysa et al. | |
| 8,902,451 B2 | 12/2014 | Moore et al. | |
| 2005/0076001 A1* | 4/2005 | Gauthier | G06F 17/211 |
| 2005/0141034 A1* | 6/2005 | Ohta | G06K 15/00 358/1.18 |
| 2011/0222107 A1* | 9/2011 | Williams | G06F 3/1205 358/1.15 |
| 2012/0288298 A1* | 11/2012 | Toriyabe | G03G 15/5083 399/82 |
| 2015/0029529 A1* | 1/2015 | Oda | H04N 1/00352 358/1.13 |
| 2015/0277817 A1* | 10/2015 | Tsujioka | G06F 3/1234 358/1.14 |

* cited by examiner

*Primary Examiner* — Gabriel I Garcia
(74) *Attorney, Agent, or Firm* — Fox Rothschild LLP (57) ABSTRACT

To troubleshoot an error, a printer uses a job ticket and printer-independent document data to perform a job, such as printing a document. The job ticket includes instructions for hardware component settings of the printer. In response to a capture bug command, the printer will capture, from a group of hardware configuration sensors, real-time values of the settings for the print device hardware components while the print device implements performs the job. The printer will save the captured real-time values of the settings, the job ticket, and the printer-independent document data to a merged file, and it will transmit the merged file to a maintenance service.

30 Claims, 10 Drawing Sheets

Configuration Report

Report Profile
Profile Date : 11-MAR-2015
Profile Time : 08:25AM WED

Device Profile
Customer Support : www.xerox.com
Supplies Number :
Customer Asset Tag Number :
Xerox Asset Tag Number :
Machine Name : WorkCenter 3225
Machine Serial Number : 3364935713
Machine speed : 29 PPM
Total Impressions : 11
Fax line Number :
Billing Plan : 0

Installed Options
Embedded Fax : Not Installed/Disabled
E-mail : Installed/Enabled
Fax Card : Installed/Enabled
Fax Memory Size : 7MB
USB : Enabled
ADF : Installed
Main Memory Size : 256 MB
Number of Trays: 2
AirPrint : Installed Enabled
Google Cloud Print : Installed/Disabled

Device Setup
System : V3.50.01.06    JUN-09-2014
Main Controller Board (MCB) : V3.50.01.06   JUN-09-2014
Image Output Terminal (IOT) : V1.00.06 01.18.2014
Network Controller : V6.01.09
IP Core : 6.9.P
PCLSe : PCL5e 7.18 04.21.2014
PCLXL : PCL6 8.02 04.29.2014
PS : 4.81.01 28.01.41 04.17.2014
IBM EPSON : IBM/EPSON 5.33 11.12.2013
SPL : SPL 5.90 05.15.2014
Startup Configuration Report : Disabled
Firmware Upgrade : Disabled

Accounting Setup
Authentication Mode : Iva

Network Setup
TCP/IP Settings
TCP/IP : Enabled
Host Name : XRXSC934E42FFDF
IP Address : 192.168.0.105

Network Setup (Cont.)
Multicast Radius : 255
MTU : 1400
HTTP Settings
HTTP : Enabled
Port Number : 80
Max Connections : 32
HTTPs : Disabled
SMTP Settings
SMTP Server :
SMTP Server TCP/IP Port : 25
Default E-mail Address :
Maximum Message Size : 4 MB
LDAP Directory Settings
Primary LDAP Server :
Primary LDAP Port Number : 389
Maximum LDAP Search Results : 25
Web Services
WS Discovery : Enabled
WS-Scan : Enabled
WS-Print : Enabled

Port Setup
Ethernet Profile
Ethernet Card : Enabled
MAC Address : 9C:93:4E:42:FF:DF
Speed : Auto
802.1X : Disabled
Auth Type : UNDEFINED
USB Port Security
USB Target Device [side] : Enabled

Media Trays
Media Trays : Manual Feed Script
Paper Type : Plain
Paper Size : A4
Media Trays : Tray 1
Paper Type : Plain
Paper Size : A4

Network Authentication setup
Kerberos
Default Realm :
Default Address :
Default Port : 88
SMB
NT Domain :
LDAP
LDAP Authentication : Disabled

POPO Count
POPO Count Test : 0

FROM FIG. 3A

Subnet Mask : 255.255.255.0
Default Gateway : 192.168.0.1
Automatic Addressing : DHCP
Wireless Mode : Infrastructure
Wireless SSID : TP-LINK_E7024A
Wireless Channel : 8
Wireless Security : WPA2 Personal
Wireless Signal Quality : Very Low
LPD : Enabled
LPD Port Number : 515
Raw TCP/IP Printing : Enabled
Raw TCP/IP Printing Port Number: 9100
IPV6 : Disabled
DNS Settings
Domain Name :
Primary DNS Server : 192.168.0.1
Alternate DNS Server 1 : 0.0.0.0
Dynamic DNS : Enabled
IPv6 Primary DNS Server : ::/128
IPv6 Alternate DNS Server : ::/128
SLP Settings
SLP : Disabled
Version : 2
Port Number : 427
Character Set : US_ASCII
Scope 1 :
Scope 2 :
Scope 3 :
Message Type : MULTICAST

FIG. 3B

```
^[%-12345X@PJL JOB
@PJL XCPT <?xml version="1.0" encoding="UTF-8"?>
@PJL XCPT <!DOCTYPE xpif SYSTEM "xpif-v02082.dtd">
@PJL XCPT <xpif version="1.0" cpss-version="2.07" xml:lang="en-US">
@PJL XCPT   <job-template-attributes>
@PJL XCPT     <capture-bug syntax="keyword">create</capture-bug>
@PJL XCPT     <create-CQ syntax="keyword">create</create-bug>
@PJL XCPT     <create-CQ syntax="keyword">augment logs</create-bug>
@PJL XCPT     <copies syntax="integer">1</copies>
@PJL XCPT     <document-reading-orientation
```

FROM FIG. 4A

401

```
@PJL XCPT       <document-reading-orientation
syntax="keyword">portrait</document-reading-orientation>
@PJL XCPT       <finishings syntax="1setOf">
@PJL XCPT            <value syntax="enum">3</value>
@PJL XCPT       </finishings>
@PJL XCPT   </job-template-attributes>
@PJL XCPT </xpif>
@PJL ENTER LANGUAGE = POSTSCRIPT
%!PS
/Courier 36 selectfont
72 720 moveto
(Hello World) show
showpage
%%EOF
```

FIG. 4B

```
^%-12345X@PJL JOB
@PJL XCPT <?xml version="1.0" encoding="UTF-8"?>
@PJL XCPT <!DOCTYPE xpif SYSTEM "xpif-v02082.dtd">
@PJL XCPT <xpif version="1.0" cpss-version="2.07" xml:lang="en-US">
@PJL XCPT    <job-template-attributes>
@PJL XCPT       <capture-bug syntax="keyword">create</capture-bug>
@PJL XCPT       <create-CQ syntax="keyword">create</create-bug>
@PJL XCPT       <job-ticket-source syntax="keyword">XPIF</job-ticket-source>
@PJL XCPT       <copies syntax="integer">1</copies>
@PJL XCPT       <document-reading-orientation
syntax="keyword">portrait</document-reading-orientation>
@PJL XCPT       <finishings syntax="1setOf">
@PJL XCPT          <value syntax="enum">3</value>
@PJL XCPT       </finishings>
```

FROM FIG. 5A

501

```
@PJL XCPT    </job-template-attributes>
@PJL XCPT    <config-report-attributes>
@PJL XCPT      <error-sheets syntax="keyword">enabled</error-sheets>
@PJL XCPT      <default-output-tray syntax="keyword">on</default-output-tray>
@PJL XCPT      <fuser temperature syntax=integer>351/fuser temperature>
@PJL XCPT      <black toner syntax=integer>27%/black toner>
@PJL XCPT    </config-report-attributes>
@PJL XCPT </xpif>^M
@PJL ENTER LANGUAGE = POSTSCRIPT
%!PS
/Courier 36 selectfont
72 720 moveto
(Hello World) show
showpage
%%EOF
```

METHOD AND SYSTEM FOR PRINT DEVICE PROBLEM CAPTURE

BACKGROUND

The process of troubleshooting print device malfunctions can be time-consuming, and it often relies on inaccurate data. When a print device encounters an error when printing a print job, the print device may generate (or a user of the device may cause the device to generate) a problem report. The user or print device will send the problem report and the printed document to a technician, who may try to recreate the problem by causing the print device to re-print the document. However, at the time of re-printing, the print device may have one or more configuration settings that differ from those that existed at the time of the error. This may make it difficult to diagnose and correct the error.

By way of simple example, a user who is trying to print a print job on size A4 paper may find that the printer actually printed the job on 8½×11 inch paper instead. This may have occurred because the printer's A4 paper tray was empty, jammed or dislodged from the print device. However, by the time that the technician attempts to re-create the problem to diagnose its cause, the tray may have been replenished, un-jammed or repositioned so that it correctly operates.

This document described methods and systems that address the problem of accurately diagnosing print device technical issues so that the issues can be corrected.

SUMMARY

In an embodiment, a print device includes a print engine, a media supply, a processing device and hardware configuration sensors. The processing device implements a method of troubleshooting an error of the print device by using a job ticket and document data of a printer-independent format to command the print device to print a print job. The job ticket includes instructions for settings of at least some of the hardware components of the print device. The processing device captures, from a group of the hardware configuration sensors, real-time values of the settings for the print device hardware components while the print device implements the command to print the print job. The processing device saves the captured real-time values of the settings, the job ticket, and the document data of the printer-independent format to a merged file, and it transmits the merged file to a maintenance service.

In some embodiments, the method may be done in response to a user detecting the error. If so, then the processing device may receive a capture bug command indicating that an error has occurred when printing a previous print job. If so, then when using the job ticket and the document data to print the print job, the print device may re-print the previous print job. In other embodiments, the method may be done in response to the print device itself detecting the error. If the print device detects that an error has occurred when printing a previous print job, it may output a prompt that prompts a user to enter the capture bug command. Alternatively, the print device may re-print the print job automatically without requiring user input.

In some embodiments, a merged file may be generated for each print job. If so, then processor may then transmit a merged file to the maintenance service only if the processor has detected that an error has occurred for that file's print job.

In some embodiment, the print device may receive the document data in a printer-independent format that is a page description language (PDL) file for the print job. The PDL file may include a PDL representing content of a document that is to be printed by a print device according to the print job. If the print device is communicatively connected to a computing device, then the computing device may receive a command to print a document that is being displayed by a word processing application of the computing device, and it may use a print driver to convert the displayed document to the PDL file.

In other embodiments, the print device may receive the document data in a portable document format.

In some embodiments, the print device may be a multifunction device. If so, then a method of troubleshooting an error of the multifunction device may include using a job ticket and document data of a printer-independent format to command the multifunction device to perform a job, wherein the job ticket includes instructions for settings of hardware components of the multifunction device. The method may include receiving a capture bug command indicating that an error occurred when performing the job. In response to the capture bug command, the method may include using the job ticket and the document data to re-perform the job within a threshold period after the multifunction device originally performed the job. The method may include capturing, from a group of the hardware configuration sensors, real-time values of the settings for the multifunction device hardware components while the multifunction device implements the capture bug command and re-performs the job. The method also may include generating a merged file that comprises the captured real-time values of the settings and the job ticket. The method may include transmitting the merged file to a maintenance service.

In the embodiment listed above, before receiving the capture bug command, the processing device may detect that an error has occurred when performing the job and output a prompt that prompts a user to enter the capture bug command. Alternatively, the device may re-perform the job automatically and without requiring user input.

In various embodiments, the multifunction device includes a print engine and the job may be a print job. If so, then performing the job may include printing the print job, and generating the merged file may comprise including the document data of the printer-independent format in the merged file.

In other embodiments, the job may be a job to scan or electronically transmit a document. For example, if the print device is a multifunction device that comprises a scanner and document handler, then the multifunction device may use the scanner to scan a document that is received by the document handler. The multifunction device also may include a communication component, and if so then the multifunction device may use the communication component to electronically transmit a document.

BRIEF DESCRIPTION OF THE DRAWINGS

FIGS. 3A and 3B illustrate an example of a configuration report, as displayed on a display screen or printed.

DETAILED DESCRIPTION

In this document, the terms "electronic device" or a "computing device" refer to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. In a virtual machine or container arrangement, a server may be an electronic device, and each virtual machine or container may also be considered to be an electronic device. In the discussion below, a client device, server device, virtual machine or container may be referred to simply as a "device" for brevity.

The term "job" refers to digital data representing an operation that a print device will perform on or to a substrate, such as printing, scanning or faxing. The term "print job" refers to a type of job, in particular digital data that represents the text, images or other content that a print device will print on a substrate, and/or instructions for printing content on a substrate. A print job is performed when a print device uses the data of the print job to print, scan, electronically transmit, or take other action on a document.

A "job ticket" is a digital data file containing job instructions for specific printer features, such as stapling or two-sided printing. A job ticket does not contain actual content to be printed, but instead it contains instructions (settings and/or commands) for various print device component settings that the print device will use to process the job. The print device will use the job ticket to process the job. Typically, although not necessarily, job ticket instructions for a print job are processed before page description language file instructions.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

A "page description language" (PDL) (sometimes referred to as a "printer definition language") is a language that describes the content of a printable page or set of pages (i.e., a print job). Typically, a PDL will describe the content at a higher level than the level at which an actual bitmap would describe those contents. The PDL for a particular print job will be stored in digital form as a PDL file.

Figure 7:
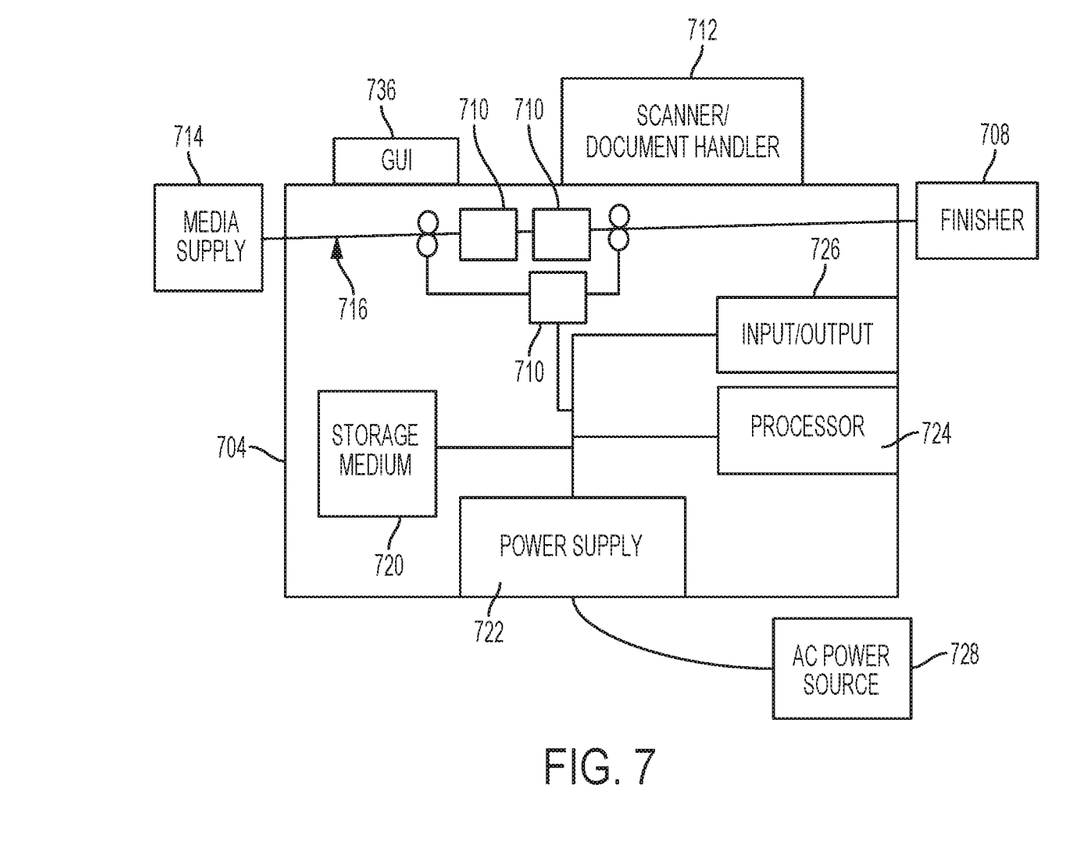
FIG. 7 illustrates an example set of components of a printing device.

The terms "print device," "printing device" and "printer" each refer to a machine having hardware capable of reading a digital document file and using the information from the file and associated print instructions to print markings on a substrate. Components of a print device typically include a print engine. A print engine typically includes print hardware such as a print head and a print cartridge containing ink, toner or another print material. A print device also includes a feeding system configured to pass a document or other substrate through the print device so that the print head can print characters and/or images on the substrate. In some embodiments, a print device may have additional capabilities such as scanning or faxing and thus may be a multi-function device. Example elements of a print device are shown in FIG. 7 and are discussed in the accompanying text.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process In this document, the singular forms "a," "an," and "the" include plural references unless the context clearly dictates otherwise. The term "comprising" means "including, but not limited to." Unless defined otherwise, all technical and scientific terms used in this document have the same meanings as commonly understood by one of ordinary skill in the art.

Figure 1:
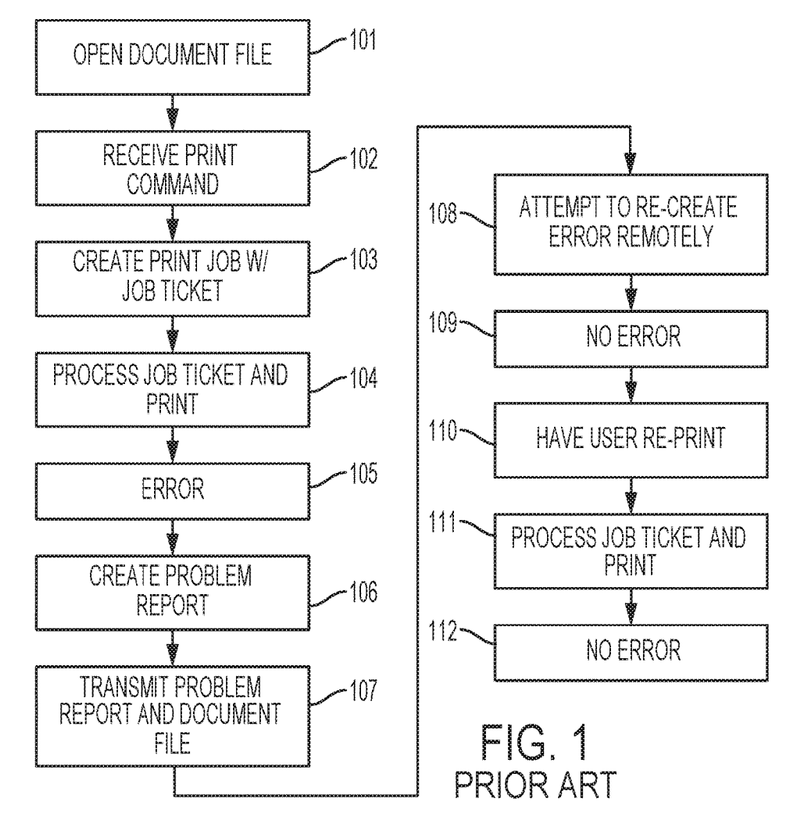
FIG. 1 illustrates an example process by which problem reports may be generated in accordance with the prior art.

FIG. 1 illustrates an example process by which problem reports may be generated in accordance with the prior art. An electronic device may open a document file (step 101), such as a word processing document, in response to a user command. When the device receives a command to print the document (step 102), a print driver installed on the device will generate a job, which may be a print job (step 103) that includes a rendering of the document in a page description language (PDL), which is a printer-independent format that the print device can process. The print job will also include a job ticket with one or more print device settings such as paper size, color or black-and-white, duplex or simplex (two-side or single-side) printing, and other settings. If the computing device is separate from the print device, the computing device will transfer the print job to the print device so that the print device can process the print job (step 104). If the computing device is integral with the print device, then the print device may simply process the print job (step 104).

When the printer prints the print job, the printer may encounter a technical issue that causes an error (step 105). When a user discovers the error, the user may command the print device to generate a problem report (step 106), attach the document file to the problem report, and send the document file and problem report to a technician for investigation (step 107).

When the technician receives the document file and problem report, the technician may attempt to re-create the error by re-processing the print job (step 108), either on a print device that is local to the technician or through a remote command to the original print device that encountered the error. However, the technician may not be able to re-create the error (step 109), typically because the local printer or original printer has one or more printer settings that differ from those that existed at the time of the error. The technician may then ask the user to re-print the print job (step 110). However, when the print device re-prints the print job (step 111) if the device does not again yield the error (step 112) the cause of the error will remain undiagnosed.

A workflow similar to that of FIG. 1 will apply when a multifunction device performs other types of jobs, such as a scan job a fax job or an electronic messaging job. Errors may occur in the document handling, document reading, and/or electronic communication steps of such a job.

Figure 2:
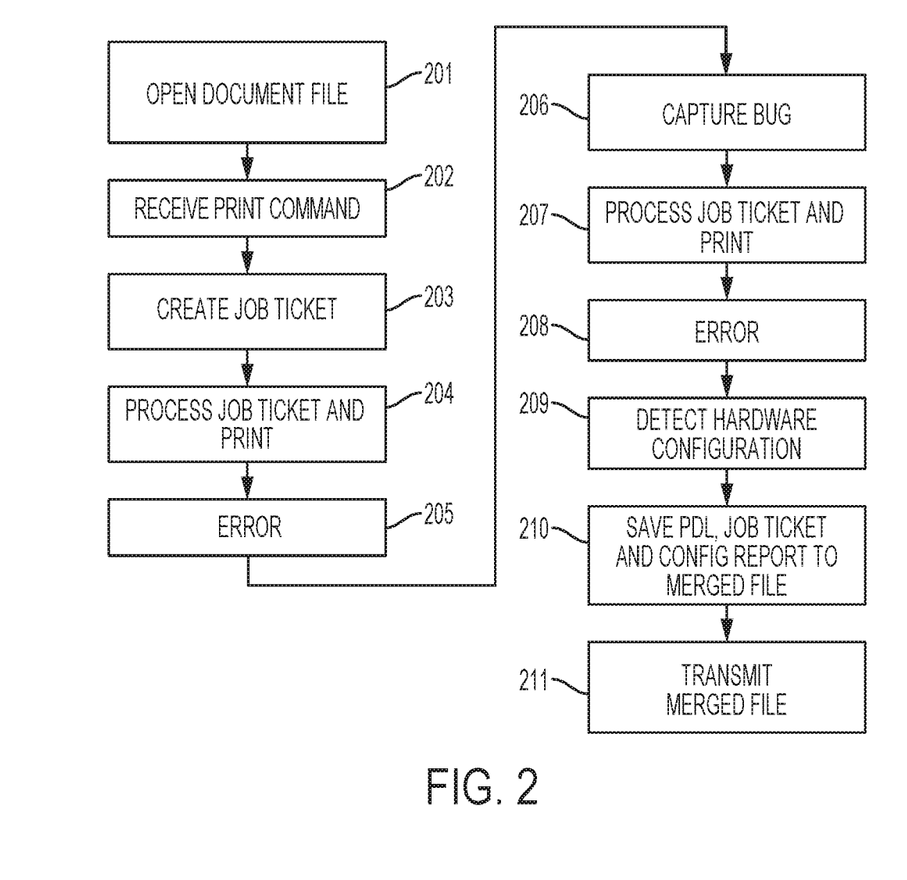
FIG. 2 illustrates an example process by which a print device problem may be diagnosed in accordance with various embodiments described in this document.

FIG. 2 illustrates an example process by which the embodiments described in this document can improve print device problem report creation. As with the process of FIG. 1, an electronic device may open a document file (step 201), such as a word processing document, in response to a user command. When the device receives a command to print the document (step 202), a print driver installed on the device will generate a print job (step 203) that includes a rendering of the document in a PDL that the print device can process (such as, for example, POSTSCRIPT® from Adobe Systems Inc.). The print job also will include a job ticket with one or more print device hardware settings such as: (i) which paper tray will supply the substrate; (ii) whether to print in color or black-and-white; (iii), duplex or simplex printing; (iv) a print quality setting; (v) a binding location (e.g., staple location); (vi) a finisher setting (e.g., a setting that causes a finisher to apply a fold or a cut to the substrate, or to collate copies); (v) a print orientation setting; (vi) a setting indicating whether to expand the document to fit the printed substrate; and/or other settings. The job ticket data may be part of the PDL or separate from the PDL but available with the PDL in the print job. If the computing device is separate from the print device, the computing device will transfer the print job to the print device so that the print device can process the print job (step 204). If the computing device is integral with the print device, then the print device may simply process the print job (step 204).

Figure 3B:
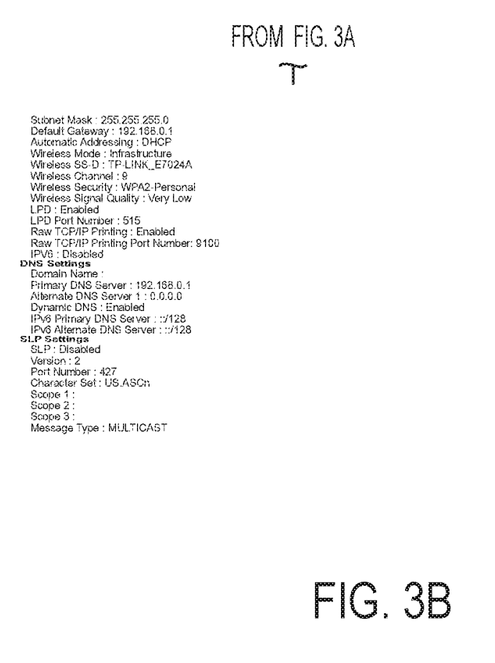

The print device will use the job ticket and PDL data to print the print job on a substrate. When the printer prints the print job, the printer may encounter a technical issue that causes an error (step 205). When a user discovers the error, the user may command the print device to perform a bug capture process (step 206) that will again process the job ticket and PDL to re-print the print job (step 207) so that the error occurs again (step 208) and the printer's processor can capture real-time values (step 209) of operation one or more print device hardware components at the time of printing. The values may be collected from various sensors in the printer, such as a toner level sensor, a media tray fill level sensor, a tray usage sensor, a paper jam sensor, a paper size sensor, a fuser temperature sensor and/or other hardware sensors that are part of the print device. FIGS. 3A and 3B illustrate an example configuration report 301 that lists these and other hardware settings that the print device may capture in this process.

Returning to FIG. 2, the system will then save the configuration report data (i.e., the captured real-time values of the hardware settings), the job ticket data and the PDL data to a merged file (step 210), which may be referred to as an "extended PDL file" for this embodiment. The merged file also may include the results of comparing job ticket data to sensed data to determine whether any differences exist between a setting that the job ticket required and an actual value that the printer accomplished, such as a job ticket setting to print on a substrate that is in a first media tray but a sensed data indicating that the print job actually printed on a substrate from a second tray. The print device and/or connected computing device will then transmit the extended PDL file to a maintenance service for further analysis (step 211).

The re-printing (step 207), error re-occurrence (step 208) and data capture (step 209) described above will occur within limited period of time after the original error occurred so that the error can be re-created. For example, these steps may occur within a threshold period of time after the original print job was processed, such as within one minute, within two minutes or within five minutes of the original print job. Alternatively or in addition, the steps may be implemented before the printer prints any other print job. Alternatively or in addition, the steps may be implemented before any of the hardware settings are changed (other than a decrease in toner level or a decrease in paper level that is commensurate with the amount of toner or paper that the print job is expected to use).

In addition, instead of a user discovering the error and commanding the print device to perform the bug capture process, in some embodiments the print device may do this. For example, if the print device implements a quality control step that creates and analyzes an image of the finished document, it may detect the error in the printed document. If so, then the print device may automatically initiate the bug capture process in step 206, or it may output a visual or audio prompt via a user interface of the print device that prompts the user to actuate the capture bug command and re-print the document.

Further, in various embodiments the process may include starting an original print job with a bug capture setting activated (step 206) and thus omitting steps 204 and 205. If so, the system may generate an extended PDL file for each print job processed while the bug capture setting is activated. When a user (or if the print device) discovers an error in the printed document (step 207), it may command the device to transmit the extended PDL document to a maintenance service (step 211). Otherwise, the system may save or discard the extended PDL file without the need to transmit the file to a maintenance service.

A workflow similar to that of FIG. 2 will apply when a multifunction device performs other types of jobs, such as a scan job a fax job or an electronic messaging job. For example, the system may receive a scan or fax command in step 202 instead of a print command, in which case the system will create a job ticket for the applicable job and save the job ticket and configuration report (but not necessarily a PDL, which may not apply in such a situation) to a merged file in step 210.

Figure 4A:
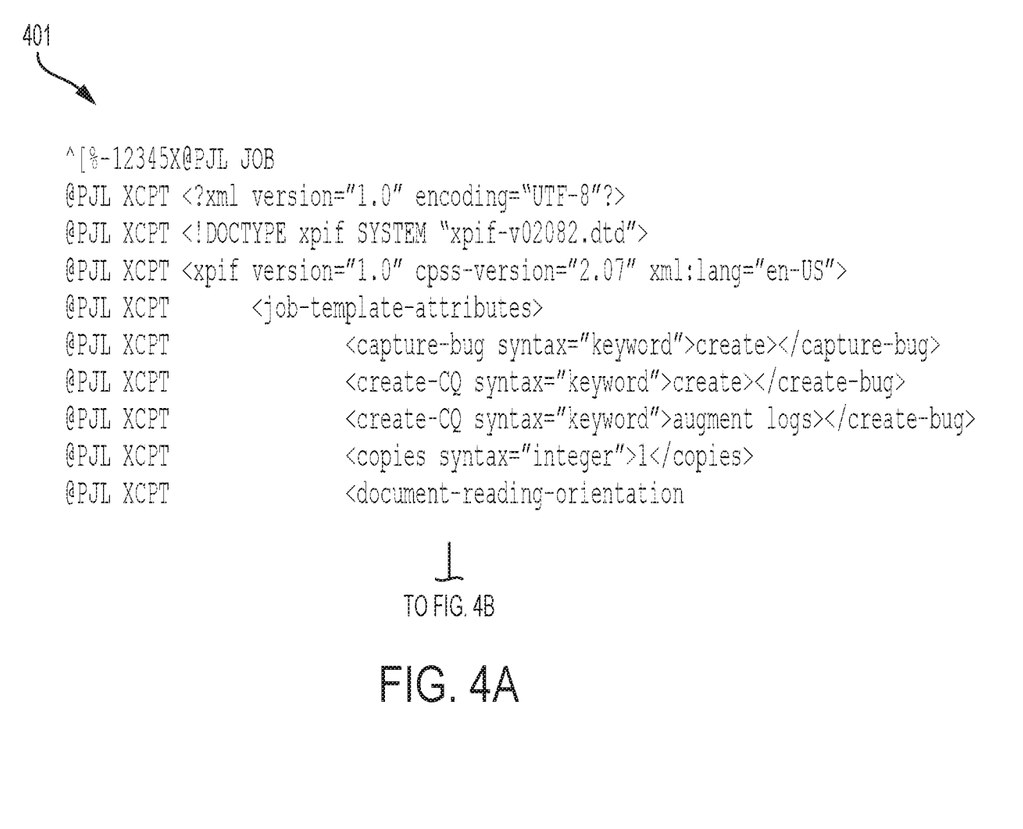
FIGS. 4A and 4B illustrate an example set of instructions for a print job with a bug capture command and document data.
Figure 4B:
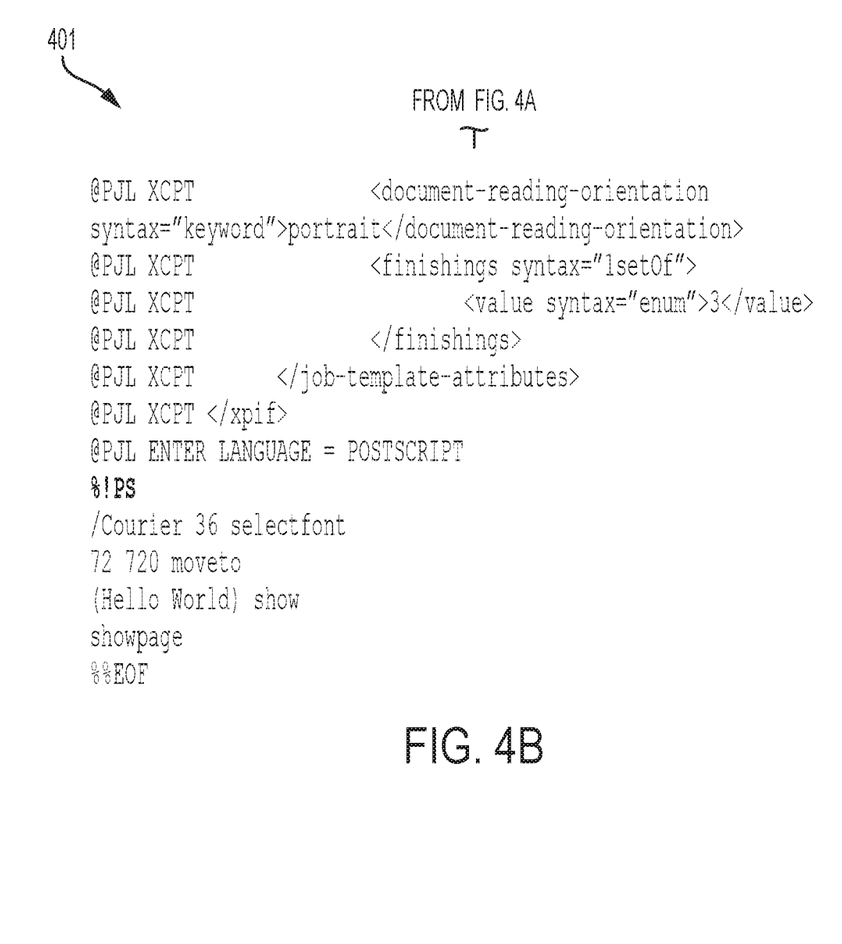

FIGS. 4A and 4B illustrate an example segment of a set of instructions 401 for a print job with a bug capture command and a PDL. In FIGS. 4A and 4B, the print job instructions are rendered in XPIF, which is an electronic job ticket format that is available from Xerox Corporation. The lines of code prior to the %!PS line (which is shown in bold in FIG. 4B) are the job ticket definition requesting that the print device print one copy of a document. The lines after the %!PS line are the PDL for the document. In the job ticket definition, the three lines of code above the underline cause the job ticket setting to capture the bug by capturing device settings when the print job is printed.

Figure 5A:
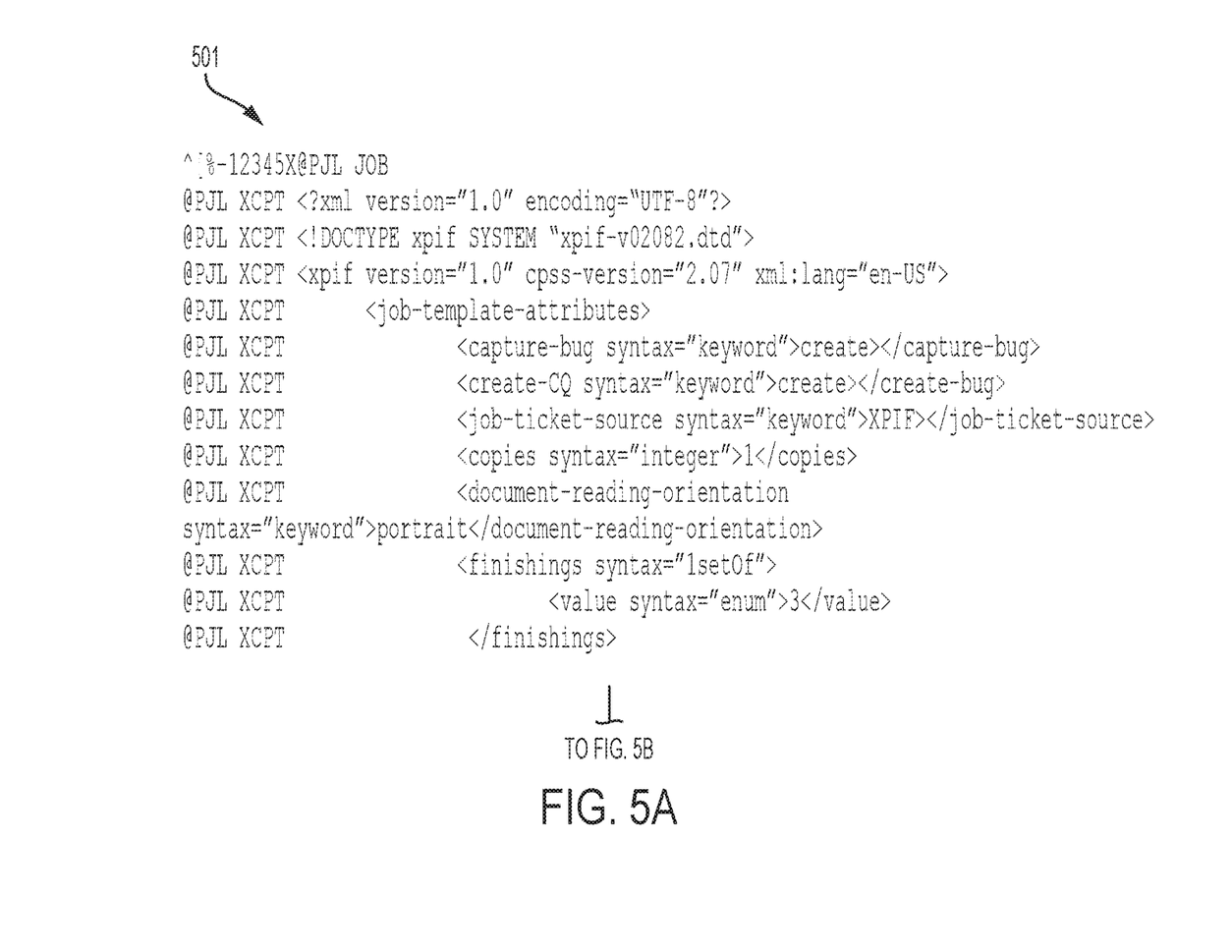
FIGS. 5A and 5B illustrate an example of a portion of a merged file with configuration data and job ticket data.
Figure 5B:
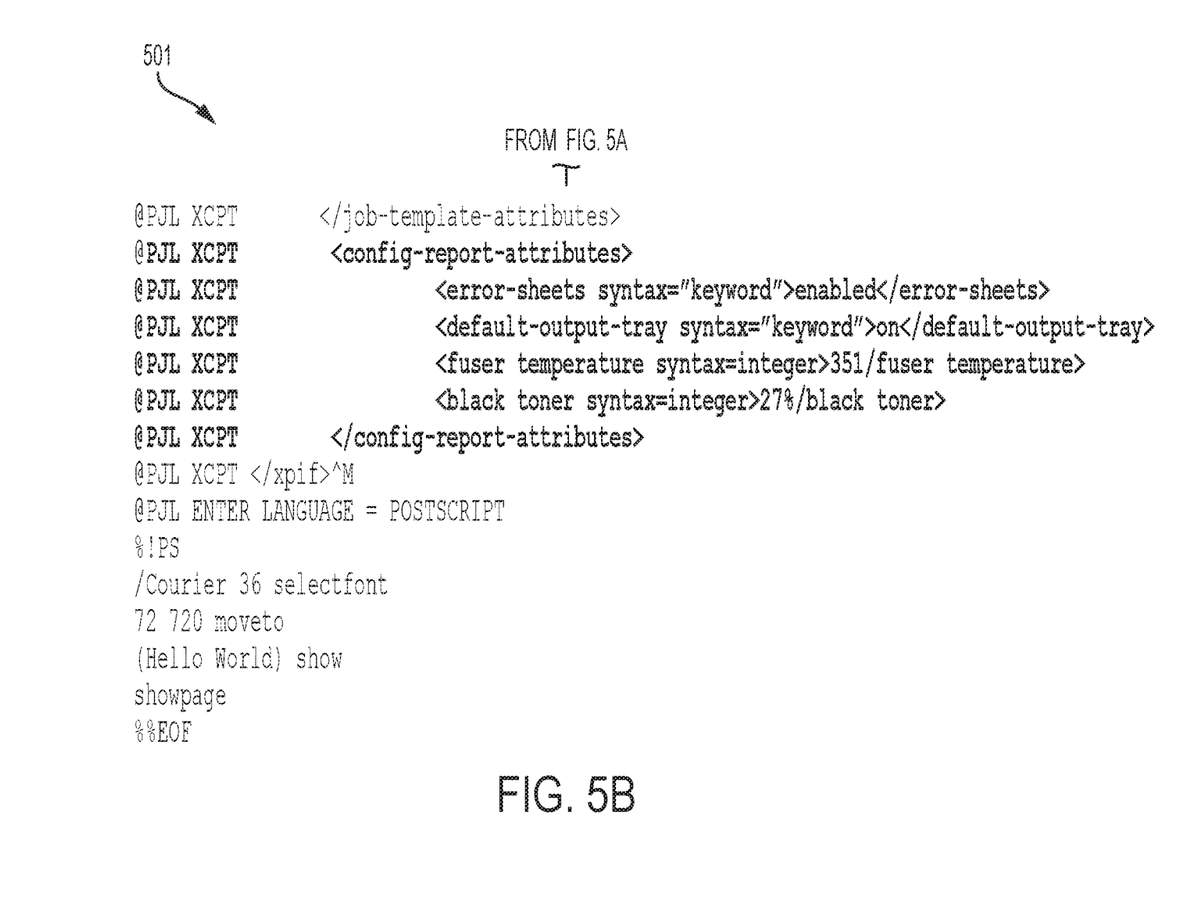

When creating the merged file (i.e., the extended PDL file), the system may include job ticket data in a header or other section of the print job document with the PDL. FIGS. 5A and 5B illustrate an example segment of a merged file 501, which includes the print job instructions of FIGS. 4A and 4B merged with a portion of the configuration report included between the </config-report-attributes> lines and highlighted in bold. In this example, the detected hardware settings are those corresponding to fuser temperature and black toner level. In the example of FIGS. 5A and 5B, the original job ticket details are included in the first few lines shown. However, in some embodiments the job ticket data may not be included in the merged file. Other file formats may be used, and are intended to be included within the scope of the invention.

Figure 6:
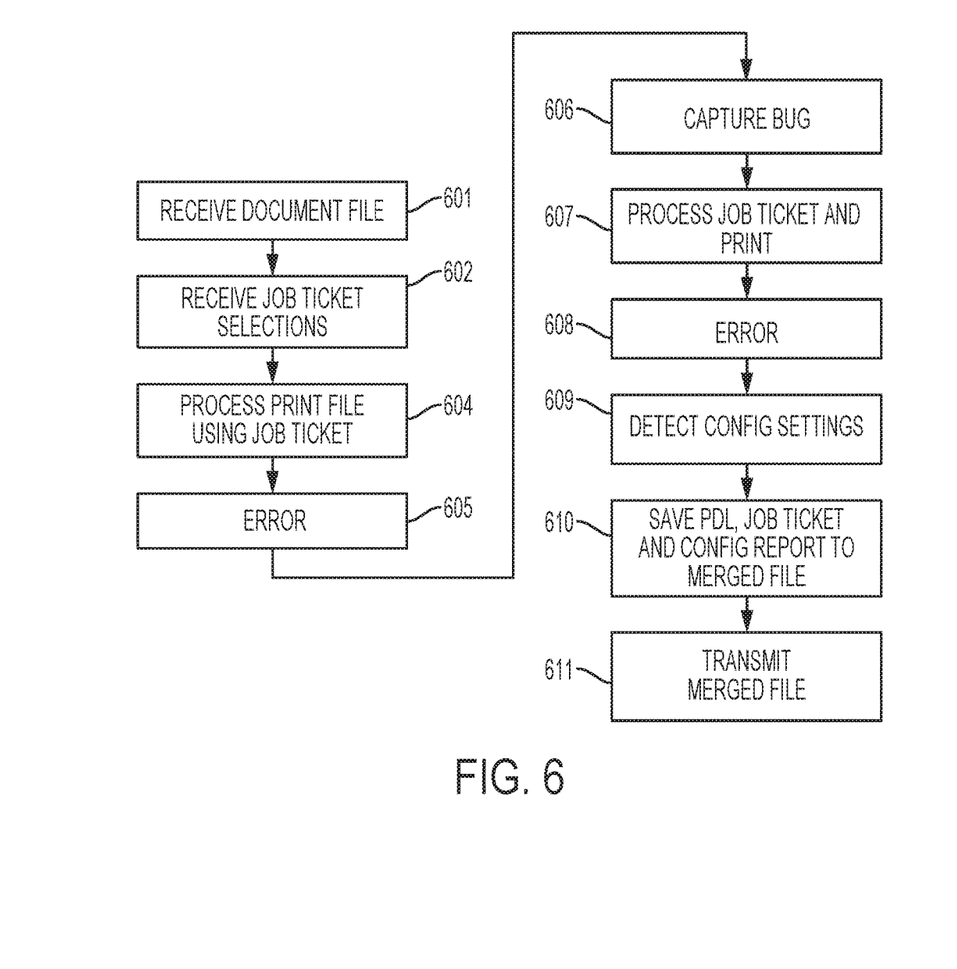
FIG. 6 illustrates an additional example process by which a print device problem may be diagnosed in accordance with various embodiments described in this document.

FIG. 6 illustrates another example of problem report creation, in this case where the document file is one that is already in printer-independent format and does not require conversion to a PDL. An example of such a file is a portable document file (PDF). The print device will receives the document file (step 601), along with settings (step 602) for a job ticket with one or more print device hardware settings such as those described above in the discussion of FIG. 2. The system may receive the settings (step 602) with the document file, or via a user interface of the print device. The print device will then process the print job (step 604) by printing the document file on a substrate according to the settings of the job ticket.

When the printer prints the print job, the printer may encounter a technical issue that causes an error (step 605). When a user discovers the error, the user may command the print device to perform a bug capture process (step 606) that will re-print the print job (step 607) so that the error occurs again (step 608) and the printer's processor can capture real-time values (step 609) of operation one or more print device hardware components at the time of printing. The values may be collected from various sensors in the printer, such as toner level sensors, media tray fill level sensors, paper jam sensors, and/or other hardware sensors that are part of the print device. The system will then save the captured real-time values of the hardware settings, the job ticket, and the PDL data or other document file to a merged file (step 610). The print device and/or connected computing device will then transmit the merged file to a maintenance service for further analysis (step 611).

As with FIG. 2, the re-printing (step 607), error re-occurrence (step 608) and data capture (step 609) steps of FIG. 6 will occur within limited period of time after the original error occurred so that the error can be re-created. In addition, instead of a user discovering the error and commanding the print device to perform the bug capture process, in some embodiments the print device may do this, in which case the print device may automatically initiate the bug capture process in step 606. Further, in various embodiments the process may include starting an original print job with a bug capture setting activated (step 606) and thus omitting steps 604 and 605. If so, the system may generate a merged document file for each print job processed while the capture bug setting is activated.

FIG. 7 illustrates an example set of components of a printing device 704, which may be used with the various embodiments disclosed in this document and which may be a printer, copier, scanner, multi-function device (MFD), direct-to-object printer, three-dimensional (3D) printer or other device that is configured to apply markings to a substrate. The printing device 704 at least one marking device (each of which may be referred to as a printing engine) 710 operatively connected to the processor 724, a media path 716 positioned to supply sheets or other types of media on which markings will be printed from a print media supply 714 to the marking device(s) 710. In a direct-to-object printer, the media path may be a movable sled that is attached to and moves along a support member in front of the marking devices. After receiving various markings from the printing engine(s), the media optionally may pass to a finisher 708 that can fold, staple, sort, or perform other finishing processes on the various printed substrates. Also, the printing device 704 may include at least one accessory functional component (such as a scanner/document handler 712). Each of the components will operate using power supplied from an external power source 728 and/or internal power supply 722.

The printing device 704 will include, and/or will be communicatively connected to, an electronic device that includes, a processor 724 that is configured to execute programming instructions stored in a memory 720 to perform functions of a print job. The memory 720 may be integral with the printing device 704 or it may be external to the print device and communicatively connected to the printing device 704 via a local or remote communications network. The printer and/or electronic device may include a user interface such as a graphical user interface (GUI) 736, a keyboard or keypad, or a microphone configured to receive audio commands. The printer and/or electronic device also may include one or more communication components such as an input/output port 726, transceiver, or other component that can receive files and data from external devices and sources.

Each print job may include one or more different settings. The different settings include for example, settings for resolution, number of sides, orientation, color mode, contrast, lighten/darken, sharpness, saturation, background suppression, compression factor, original size, edge erase, blank page removal, as well as other settings depending upon implementation.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of troubleshooting a print device error, comprising:
　by a processing device of a print device that includes a print engine, a media supply, the processing device and a plurality of hardware configuration sensors:
　　using a job ticket and document data of a printer-independent format to command the print device to print a print job, wherein the job ticket includes instructions for settings of a plurality of hardware components of the print device;
　　capturing, from a group of the hardware configuration sensors, real-time values of the settings for the print device hardware components while the print device implements the command to print the print job;
　　saving the captured real-time values of the settings, the job ticket, and the document data of the printer-independent format to a merged file;
　　transmitting the merged file to a maintenance service;
　　before the printing and the capturing, receiving a capture bug command indicating that an error has occurred when printing a previous print job; and
　　when using the job ticket and the document data to print the print job, re-printing the previous print job.

2. The method of claim 1, further comprising, by the processing device:
　before the printing and the capturing, detecting that an error has occurred when printing a previous print job;

outputting a prompt that prompts a user to enter a capture bug command; and when using the job ticket and the document data to print the print job, doing so in response to the capture bug command.

3. The method of claim 1, further comprising, by the processing device:

before the printing and the capturing, detecting that an error has occurred when printing a previous print job; and when using the job ticket and the document data to print the print job, doing so by re-printing the previous print job automatically without requiring user input.

4. The method of claim 1, further comprising, by the processing device:

detecting whether an error has occurred when printing the print job; and transmitting the merged file to the maintenance service only if the processing device has detected that an error has occurred.

5. The method of claim 1, further comprising receiving the document data, and wherein:

the printer-independent format is a page description language (PDL) file for the print job; and the PDL file comprises a PDL representing content of a document that is to be printed by a print device according to the print job.

6. The method of claim 5, further comprising, by a computing device that is communicatively connected to the print device:

receiving a command to print a document that is being displayed by a word processing application of the computing device;

using a print driver to convert the displayed document to the PDL file.

7. The method of claim 1:

further comprising receiving the document data; and wherein the printer-independent format is a portable document format.

8. A method of troubleshooting a multifunction device error, comprising:

by a processing device of a multifunction device that includes a plurality of hardware configuration sensors:

using a job ticket and document data of a printer-independent format to command the multifunction device to perform a job, wherein the job ticket includes instructions for settings of a plurality of hardware components of the multifunction device;

receiving a capture bug command indicating that an error occurred when performing the job;

in response to the capture bug command, using the job ticket and the document data to re-perform the job within a threshold period after the multifunction device originally performed the job;

capturing, from a group of the hardware configuration sensors, real-time values of the settings for the multifunction device hardware components while the multifunction device implements the capture bug command and re-performs the job;

generating a merged file that comprises the captured real-time values of the settings and the job ticket; and transmitting the merged file to a maintenance service.

9. The method of claim 8, further comprising, by the processing device:

before receiving the capture bug command, detecting that an error has occurred when performing the job; and outputting a prompt that prompts a user to enter the capture bug command.

10. The method of claim 8, further comprising, by the processing device:

before receiving the capture bug command, detecting that an error has occurred when performing the job;

generating the capture bug command in response to detecting that the error has occurred; and when using the job ticket and the document data to re-perform the job, doing so automatically without requiring user input.

11. The method of claim 8, further comprising, by the processing device:

detecting whether an error has occurred when re-performing the job; and transmitting the merged file to the maintenance service only if the processing device has detected that an error has occurred.

12. The method of claim 8, wherein the job is a print job;

performing the job comprises printing the print job;

generating the merged file also comprises including the document data of the printer-independent format in the merged file;

the printer-independent format is a page description language (PDL) file for the print job; and the PDL file comprises a PDL representing content of a document that is to be printed by the print engine of the multifunction device according to the print job.

13. The method of claim 12, further comprising, by a computing device that is communicatively connected to the print device:

receiving a command to print a document that is being displayed by a word processing application of the computing device;

using a print driver to convert the displayed document to the PDL file.

14. The method of claim 8:

further comprising receiving the document data; and wherein the printer-independent format is a portable document format.

15. The method of claim 8, wherein performing the job comprises scanning or electronically transmitting a document.

16. A system for troubleshooting a print device error, comprising:

a print engine;

a plurality of sensors for hardware components of a print device with which the print engine is associated;

a processor, and a memory containing programming instructions that area configured to cause the processor to:

use a job ticket and document data of a printer-independent format to command the print device to perform a job, wherein the job ticket includes instructions for settings of a plurality of hardware components of the multifunction device;

receive a capture bug command indicating that an error occurred when performing the job;

in response to the capture bug command, use the job ticket and the document data to re-perform the job within a threshold period after the multifunction device originally performed the job;

capture, from a group of the hardware configuration sensors, real-time values of the settings for the multifunction device hardware components while the multifunction device implements the capture bug command and re-performs the job; and
generate a merged file that comprises the captured real-time values of the settings and the job ticket.

17. The system of claim 16, further comprising additional programming instructions that are configured to cause the processor to cause print device to transmit the merged file to a maintenance service.

18. The system of claim 16, wherein
the job is a print job;
the instructions to perform the job comprise instructions to print the print job;
the instructions to generate the merged file also comprise instructions to include the document data of the printer-independent format in the merged file;
the printer-independent format is a page description language (PDL) file for the print job; and
the PDL file comprises a PDL representing content of a document that is to be printed by the print engine of according to the print job.

19. The method of claim 16, wherein:
the print device is a multifunction device that comprises a scanner and document handler; and
the instructions to perform the job comprise instructions to use the scanner to scan a document that is received by the document handler.

20. The method of claim 16, wherein:
the print device is a multifunction device that comprises a communication component; and
the instructions to perform the job comprise instructions to use the communication component to electronically transmit a document.

21. A method of troubleshooting a print device error, comprising:
by a processing device of a print device that includes a print engine, a media supply, the processing device and a plurality of hardware configuration sensors:
using a job ticket and document data of a printer-independent format to command the print device to print a print job, wherein the job ticket includes instructions for settings of a plurality of hardware components of the print device;
capturing, from a group of the hardware configuration sensors, real-time values of the settings for the print device hardware components while the print device implements the command to print the print job;
saving the captured real-time values of the settings, the job ticket, and the document data of the printer-independent format to a merged file;
transmitting the merged file to a maintenance service;
before the printing and the capturing, detecting that an error has occurred when printing a previous print job;
outputting a prompt that prompts a user to enter a capture bug command; and
when using the job ticket and the document data to print the print job, doing so in response to the capture bug command and re-printing the previous print job.

22. The method of claim 21, further comprising, by the processing device:
detecting whether an error has occurred when printing the print job; and
transmitting the merged file to the maintenance service only if the processing device has detected that an error has occurred.

23. The method of claim 21, further comprising receiving the document data, and wherein:

the printer-independent format is a page description language (PDL) file for the print job; and
the PDL file comprises a PDL representing content of a document that is to be printed by a print device according to the print job.

24. The method of claim 23, further comprising, by a computing device that is communicatively connected to the print device:
receiving a command to print a document that is being displayed by a word processing application of the computing device;
using a print driver to convert the displayed document to the PDL file.

25. The method of claim 21:
further comprising receiving the document data; and
wherein the printer-independent format is a portable document format.

26. A method of troubleshooting a print device error, comprising:
by a processing device of a print device that includes a print engine, a media supply, the processing device and a plurality of hardware configuration sensors:
using a job ticket and document data of a printer-independent format to command the print device to print a print job, wherein the job ticket includes instructions for settings of a plurality of hardware components of the print device;
capturing, from a group of the hardware configuration sensors, real-time values of the settings for the print device hardware components while the print device implements the command to print the print job;
saving the captured real-time values of the settings, the job ticket, and the document data of the printer-independent format to a merged file;
transmitting the merged file to a maintenance service;
before the printing and the capturing, detecting that an error has occurred when printing a previous print job; and
when using the job ticket and the document data to print the print job, doing so by re-printing the print job automatically without requiring user input.

27. The method of claim 26, further comprising, by the processing device:
detecting whether an error has occurred when printing the print job; and
transmitting the merged file to the maintenance service only if the processing device has detected that an error has occurred.

28. The method of claim 26, further comprising receiving the document data, and wherein:
the printer-independent format is a page description language (PDL) file for the print job; and
the PDL file comprises a PDL representing content of a document that is to be printed by a print device according to the print job.

29. The method of claim 28, further comprising, by a computing device that is communicatively connected to the print device:
receiving a command to print a document that is being displayed by a word processing application of the computing device;
using a print driver to convert the displayed document to the PDL file.

30. The method of claim 26:
further comprising receiving the document data; and wherein the printer-independent format is a portable document format.

\* \* \* \* \*